(12) United States Patent
Fang

(10) Patent No.: US 6,461,227 B1
(45) Date of Patent: Oct. 8, 2002

(54) METHOD OF POLISHING A MEMORY OR RIGID DISK WITH AN AMMONIA-AND/OR HALIDE-CONTAINING COMPOSITION

(75) Inventor: Mingming Fang, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 45 days.

(21) Appl. No.: 09/690,585

(22) Filed: Oct. 17, 2000

(51) Int. Cl.⁷ .................................................. B24B 1/00
(52) U.S. Cl. ............................ 451/41; 451/60; 51/307; 252/29.4; 510/165
(58) Field of Search ............................ 451/41, 28, 60; 51/307–309; 252/29.4; 510/165; 438/690, 693

(56) References Cited

U.S. PATENT DOCUMENTS

| | | | |
|---|---|---|---|
| 3,385,682 A | 5/1968 | Lowen | |
| 4,769,046 A * | 9/1988 | Senda et al. | 51/293 |
| 5,230,833 A | 7/1993 | Romberger et al. | |
| 5,637,185 A | 6/1997 | Murarka et al. | |
| 5,700,383 A | 12/1997 | Feller et al. | |
| 5,773,364 A | 6/1998 | Farkas et al. | |
| 5,858,813 A | 1/1999 | Scherber et al. | |
| 5,876,266 A | 3/1999 | Miller et al. | |
| 5,916,855 A | 6/1999 | Avanzino et al. | |
| 5,993,685 A | 11/1999 | Currie et al. | |
| 5,993,686 A | 11/1999 | Streinz et al. | |
| 6,022,837 A * | 2/2000 | Oowaki | 510/165 |
| 6,117,775 A * | 9/2000 | Kondo et al. | 438/690 |
| 6,149,696 A * | 11/2000 | Jia | 51/308 |
| 6,174,454 B1 * | 1/2001 | Tsai et al. | 252/79.4 |

* cited by examiner

Primary Examiner—George Nguyen

(57) ABSTRACT

A method for planarizing or polishing a memory or rigid disk is provided. The method comprises abrading at least a portion of the surface with a polishing system comprising (i) a polishing composition comprising water, an oxidizing agent, and a complexing agent selected from the group consisting of ammonia, halide ions, and mixtures thereof, and (ii) a polishing pad and/or an abrasive.

22 Claims, No Drawings

METHOD OF POLISHING A MEMORY OR RIGID DISK WITH AN AMMONIA-AND/OR HALIDE-CONTAINING COMPOSITION

TECHNICAL FIELD OF THE INVENTION

This invention pertains to a method of planarizing or polishing a surface of a memory or rigid disk.

BACKGROUND OF THE INVENTION

The demand for increased storage capacity in memory or rigid disks and the trend towards miniaturization of memory or rigid disks (due to the requests of computer manufacturers for smaller hard drives) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

In particular, such polishing compositions and/or methods can result in less than desirable polishing rates and high surface defectivity when applied to memory or rigid disks. The performance of a memory or rigid disk is directly associated with its surface quality. Thus, it is crucial that the polishing compositions and methods maximize the polishing or removal rate yet minimize surface defectivity of the memory or rigid disk following planarization or polishing.

There have been many attempts to improve the removal rate of memory or rigid disks during polishing, while minimizing defectivity of the polished surface during planarization or polishing. For example, U.S. Pat. No. 4,769,046 discloses a method for polishing a nickel-plated layer on a rigid disk using a composition comprising aluminum oxide and a polishing accelerator such as nickel nitrate, aluminum nitrate, or mixtures thereof. There remains a need, however, for improved methods of planarizing or polishing memory or rigid disks at a high removal rate, while minimizing surface defectivity. The present invention seeks to provide such a method. These and other advantages of the present inventive method will be apparent from the description of the invention provided herein.

BRIEF SUMMARY OF THE INVENTION

The present invention provides a method for planarizing or polishing a surface of a memory or rigid disk comprising (a) providing a polishing system comprising (i) a polishing composition comprising water, an oxidizing agent, and a complexing agent selected from the group consisting of ammonia, halide ions, and mixtures thereof, and (ii) a polishing pad and/or an abrasive, (b) contacting at least a portion of a surface of a memory or rigid disk with the polishing system, and (c) moving the polishing system relative to the memory or rigid disk to polish at least a portion of the surface of a memory or rigid disk.

DETAILED DESCRIPTION OF THE INVENTION

The present invention provides a method for planarizing or polishing a surface of a memory or rigid disk through use of a polishing system. The polishing system comprises (i) a polishing composition comprising water, an oxidizing agent, and a complexing agent selected from the group consisting of ammonia, halide ions, an mixtures thereof, and (ii) a polishing pad and/or an abrasive. At least a portion of the surface of the memory or rigid disk is contacted with the polishing system, and the polishing system is moved relative to the memory or rigid disk to polish at least a portion of the surface of the memory or rigid disk.

The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material.

The abrasive of the polishing system can be any suitable abrasive. The abrasive desirably is in the form of particles and desirably is a metal oxide (e.g., metal oxide particles). Metal oxide abrasives include, for example, alumina, silica, titania, ceria, zirconia, germania, magnesia, coformed products thereof, and mixtures thereof Preferably, the abrasive of the polishing system is a condensation-polymerized metal oxide (e.g, condensation-polymerized silica particles). Condensation-polymerized silica particles typically are prepared by condensing $Si(OH)_4$ to form colloidal particles. Such abrasive particles can be prepared in accordance with U.S. Pat. No. 5,230,833 or can be obtained as any of various commercially available products, such as the Akzo-Nobel Bindzil 50/80 product and the Nalco 1050, 2327, and 2329 products, as well as other similar products available from DuPont, Bayer, Applied Research, Nissan Chemical, and Clariant.

It should be understood that the polishing or planarization of a memory or rigid disk can involve two or more distinct polishing steps, utilizing different polishing systems, or alternatively utilizing substantially similar, or even the same, polishing systems. It is suitable, for example, to utilize in a first polishing step a "coarse" polishing system comprising abrasive particles with a particle size greater than 100 nm, and to utilize in a second polishing step a "fine" polishing system comprising abrasive particles with a particle size less than 100 nm.

The abrasive particles of the polishing system of the present invention, especially when formulated as a "fine" polishing system, desirably are such that about 90% or more of the abrasive particles (by number) have a particle size no greater than 100 nm. Preferably, the abrasive particles are such that at least about 95%, 98%, or even substantially all (or actually all) of the abrasive particles (by number) have a particle size no greater than 100 nm. These particle size preferences for the abrasive particles (i.e., whereby at least about 90%, 95%, 98%, substantially all, and all of the abrasive particles (by number) are no greater than a specific size of abrasive particle) also can pertain to other particle sizes, such as 95 nm, 90 nm, 85 nm, 80 nm, 75 nm, 70 nm, and 65 nm.

Similarly, the abrasive can be such that at least about 90%, 95%, 98%, or even substantially all (or actually all) of the abrasive particles (by number) have a particle size no less than 5 nm. These particle size preferences for the abrasive particles (i.e., whereby at least about 90%, 95%, 98%, substantially all, and all of the abrasive particles (by number) are no less than a specific size of abrasive particle) also can pertain to other particle sizes, such as 7 nm, 10 nm, 15 nm, 25 nm, and 30 nm.

The percentage values used herein to describe the nature of the abrasive in terms of particle size are percentages "by number," rather than being weight percentages, unless otherwise noted. The particle size of the abrasive refers to the particle diameter. The particle size can be measured by any suitable technique. The particle size values set forth herein are based on a visual inspection, specifically by way of transmission electron micrography (TEM), of a statistically significant sample of the abrasive particles, preferably at least 200 particles.

The particle size distribution of the abrasive can be characterized by geometric standard deviation by number, referred to as sigma-g ($\sigma_g$). The $\sigma_g$ values can be obtained by dividing (a) the diameter at which 84% of the abrasive particles (by number) are less than by (b) the diameter at which 16% of the abrasive particles (by number) are less than (i.e., $\sigma_g = d_{84}/d_{16}$). Monodispersed abrasive particles have a $\sigma_g$ value of about 1. As the abrasive particles become polydispersed (i.e., include particles of increasingly different size), the $\sigma_g$ value of the abrasives particles increases above 1. Although the abrasive particles suitable for use in conjunction with the present invention can be mono or poly dispersed to any degree, the abrasive particles typically have a $\sigma_g$ value of about 2.5 or less (e.g., about 2.3 or less). The abrasive particles desirably have a $\sigma_g$ value of at least about 1.1 (e.g., about 1.1–2.3), preferably a $\sigma_g$ value of at least about 1.3 (e.g., about 1.5–2.3 or even about 1.8–2.3).

The abrasive of the polishing system can be provided by any suitable manner. It is suitable, for example, for the abrasive to be provided separately from the polishing composition (e.g., as a separate suspension or slurry), or the abrasive can be incorporated into the polishing composition (e.g., suspended in the polishing composition) prior to polishing. It is also suitable for the abrasive material of the polishing system to be fixed (e.g., embedded), in whole or in part, in or on a polishing pad or other surface placed in contact with the polishing composition and surface of the memory or rigid disk.

Any suitable amount of the abrasive can be present in the polishing system, generally in the form of abrasive particles suspended in a liquid carrier of the polishing composition. Preferably, the abrasive particles are present in a concentration of about 0.1 wt. % or more (e.g., 0.1–30 wt. %) of the polishing composition, or even about 1–20 wt. % of the polishing composition. More preferably, the abrasive particles are present. in a concentration of about 2–15 wt. % of the polishing composition (e.g., about 3–12 wt. % of the polishing composition, or even about 4–10 wt. % of the polishing composition).

The oxidizing agent (i.e., oxidant) of the polishing system can be any suitable oxidizing agent. Suitable oxidizing agents include, for example, compounds which comprise one or more peroxy groups (—O—O—). Suitable percompounds include, for example, peroxides, persulfates (e.g., monopersulfates and dipersulfates), percarbonates, perbromates, perborates, perchlorates, periodates, permanganates, and acids thereof, salts thereof, and mixtures thereof. Other suitable oxidizing agents include, for example, bromates, chlorates, chromates, dichromates, iodates, nitrates, sulfates, citrates, cerium (IV) compounds (e.g., ammonium cerium nitrate), oxidizing metal salts (e.g., iron salts, aluminum salts, and the like), oxidizing metal complexes, nonmetallic oxidizing acids, phosphonium salts, ferricyanides (e.g., potassium ferricyanide), trioxides (e.g., vanadium trioxide), and acids thereof, salts thereof, and mixtures thereof Most preferred oxidizing agents include, for example, hydrogen peroxide, benzyl peroxide, di-tbutyl peroxide, persulfates, ferric nitrate, hydroxylamine nitrate, and mixtures thereof Preferably, the oxidizing agent is one which does not chemically react with the ammonia present in the polishing system (e.g., a hypochlorite)

Any suitable amount of the oxidizing agent can be present in the polishing system, particularly the polishing composition. The oxidizing agent desirably is present in an amount of about 0.01 wt. % or more (e.g. about 0.05 wt. % or more). Preferably, the oxidizing agent is present in an amount of about 0.1 wt. % or more (e.g., about 0.5 wt. % or more), or even about 1 wt. % (e.g., about 5 wt. % or more). Generally, the oxidizing agent is present in the polishing composition in an amount that does not exceed about 15 wt. %, preferably an amount that does not exceed about 10 wt. % (e.g., about 8 wt. %). Accordingly, the oxidizing agent is typically present in an amount of about 0.01–10 wt. % (i.e., about 0.1–5 wt. %, or about 0.2–2 wt. %).

The present invention comprises a complexing agent selected from the group consisting of ammonia, halide ions, and mixtures thereof The complexing agent can be provided by any suitable source of ammonia, halide ions, or a mixture thereof Suitable sources of ammonia include any compound or composition that is capable of providing ammonia in an aqueous solution. Examples of such compounds and compositions include ammonia (e.g., aqueous ammonia), and any of a variety of known ammonium salts and bases (e.g., ammonium hydroxide, ammonium chloride, etc.). Likewise, suitable sources of halide ions include any compound capable of providing halide ions in aqueous solution. Such compounds include, for example, halide salts (e.g, potassium chloride, potassium bromide, potassium iodide, etc.), as well as halide acids (e.g, hydrochloric acid, hydrofluoric acid, etc.). Any halide ion can be provided by the complexing agent source. For example, the halide ion can be fluoride, chloride, bromide, iodide, or a mixture thereof Furthermore, the complexing agent can be provided by another component of the polishing system. For example, the complexing agent can be provided by the oxidizing agent in some cases (e.g, when using ammonium persulfate as an oxidizing agent).

Any suitable amount of the complexing agent can be present in the polishing system, particularly the polishing composition. The polishing rate attainable using the polishing system of the present invention depends, at least in part, on the amount of the complexing agent provided in the system. The amount of complexing agent, therefore, will depend in part on the application for which the polishing system is used.

As mentioned above, ammonia can be used as the complexing agent. Since ammonia ($NH_3$) is a weak base, it dissolves in water to give a relatively small percentage of ammonium ($NH_4^+$) and hydroxide (OH) ions. The relative amount of $NH_3$ and $NH_4^+$ present in the system at any given point in time will vary depending on various environmental factors (e.g., temperature, pH, etc.), which factors can change during polishing. Accordingly, the "concentration of ammonia" as that term is used herein refers to the combined concentration of ammonia molecules and the ammonium ions present in the polishing composition. Generally, ammonia is present in the polishing composition in a concentration of about 0.01 M or more (e.g., about 0.02 M or more). Preferably, ammonia is present in a concentration of about 0.03 M or more (e.g., about 0.05 M or more), or even about 0.1 M or more (e.g., about 0.15 M or more). Generally, ammonia is present in the polishing composition in a concentration that does not exceed about 2 M (e.g., does not exceed about 1 M, or even about 0.5 M). Accordingly, the total amount of ammonia can be present in a concentration of about 0.012 M (e.g., about 0.02–0.5 M or about 0.03–0.2 M).

Generally, the halide ion (if present in the polishing composition) is present in an amount of about 0.01 wt. % or more (e.g., about 0.05 wt. % or more) of the polishing composition. Preferably, the halide ion is present in an amount of about 0.1 wt. % or more (e.g, about 0.5 wt. % or more), or even about 1 wt. % or more (e.g., about 2 wt. % or more), of the polishing composition. Generally, the halide ion is present in the polishing composition in an amount that does not exceed about 12 wt. % (e.g., does not exceed about 8 wt. %, or even about 5 wt. %). Accordingly, the halide ion can be present in an amount of about 0.01–12 wt. % (e.g., about 0.1–8 wt. % or about 0.2–4 wt. %).

The pH of the polishing system can be any suitable pH. With some formulations of the present invention (e.g., when using an ammonia complexing agent), the pH of the polishing system is preferably at least about 7 (e.g, at least about 9). Generally, the pH of such polishing systems will be in the range of about 8–12, or even about 8–10. Other formulations of the polishing system desirably have a pH of less than about 7 (e.g., less than about 5). In such polishing systems, it is suitable for the pH of the polishing system to be about 1–4, about 2–4, or even about 2–3.

The pH of the polishing system can be adjusted, if necessary, in any suitable manner (e.g., by adding a pH adjuster to the polishing system). Suitable pH adjusters include, for example, bases such as potassium hydroxide, ammonium hydroxide, sodium carbonate, and mixtures thereof, as well as acids such as mineral acids (e.g., nitric acid, hydrochloric acid, and sulfuric acid) and organic acids (e.g., acetic acid, citric acid, malonic acid, succinic acid, tartaric acid, and oxalic acid).

The polishing system, particularly the polishing composition, optionally can further comprise one or more other additives. Such additives include surfactants (e.g., cationic surfactants, anionic surfactants, nonionic surfactants, amphoteric surfactants, fluorinated surfactants, and mixtures thereof), polymeric stabilizers or other surface active dispersing agents (e.g., organic acids, tin oxides, and phosphonate compounds), and additional polishing accelerators (e.g., metal, particularly ferric metal, sulfates, compounds with carboxylate, hydroxyl, sulfonic, and/or phosphonic groups, di-, tri-, multi, and poly-carboxylic acids and salts (such as tartarjc acids and tartrates, malic acid and malates, malonic acid and malonates, gluconic acid and gluconates, citric acid and citrates, phthalic acid and phthalates, pyrocatecol, pyrogallol, gallic acid and gallates, tannic acid and tannates), amine-containing compounds (such as primary, secondary, tertiary, and quaternary amines and phosphate-containing compounds), and mixtures thereof).

The surface of the memory or rigid disk can be planarized or polished with the polishing system of the present invention by any suitable technique. In this regard, it is suitable for the polishing system to be formulated prior to delivery to the polishing pad or to the surface of the substrate. It is also suitable for the polishing system to be formulated (e.g., mixed) on the surface of the polishing pad or on the surface of the substrate, through delivery of the components of the polishing system from two or more distinct sources, whereby the components of the polishing system meet at the surface of the polishing pad or at the surface of the substrate. The flow rate at which the components of the polishing system are delivered to the polishing pad or to the surface of the substrate (i.e., the delivered amounts of the particular components of the polishing system) can be altered prior to the polishing process and/or during the polishing process. Moreover, it is suitable for the particular components of the polishing system being delivered from two or more distinct sources to have different pH values, or alternatively to have substantially similar, or even equal, pH values, prior to delivery to the surface of the polishing pad or to the surface of the substrate. It is also suitable for the particular components being delivered from two or more distinct sources to be filtered, either independently or jointly (e.g., together), prior to delivery to the surface of the polishing pad or to the surface of the substrate.

The surface of the memory or rigid disk can be planarized or polished with the polishing system using any suitable polishing pad (e.g, polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, and coformed products thereof, and mixtures thereof As discussed above, the abrasive of the polishing system can be fixed (e.g, embedded) in whole or in part, in or on the polishing pad. Such fixation on the polishing pad can be accomplished, for example, by blending the abrasive material (e.g., abrasive particles) into the aforementioned polymers during the formation of the polishing pad.

The viscosity of the polishing system can be adjusted by altering the concentrations of the particular components of the polishing system. The viscosity of the polishing system also can be adjusted through the addition of any suitable rheological control agent (i.e., a polymeric Theological control agent). Suitable rheological control agents include, for example, urethane polymers (e.g, urethane polymers with a molecular weight greater than about 100,000

Daltons), and acrylates comprising one or more acrylic sub-units (e.g., vinyl acrylates and styrene acrylates), and polymers, copolymers, and oligomers thereof, and salts thereof.

EXAMPLES

The following examples further illustrate the present invention but, of course, should not be construed as in any way limiting its scope. These examples illustrate the use of the present invention to polish rigid disks (i.e., memory disks). The rigid disks polished in these examples were commercially available nickel-phosphor coated (i.e., plated) disks (manufactured by Seagate Technology). The surfaces of the rigid disks were pre-polished and had a surface roughness of 10–50 Å.

Polishing rates reported herein reflect a reduction in the thickness of the nickel phospor surface of the disk over time. These rates were determined by weighing the clean, dry rigid disk prior to polishing and after polishing for a certain time interval to ascertain the amount of material (by weight) lost as a result of the polishing process. The reduction in the thickness of the nickel-phosphor layer of the disk was calculated from the weight-loss, assuming a nickel-phosphor density of 8.05 g/cm$^3$.

In each of the following examples, the rigid disk was polished on a table-top polishing machine (manufactured by Strauer (West Lake, Ohio)) using a 25.4 cm diameter Politex Hi pad (manufactured by Rodel). The polishing processes were performed using a platen speed of 150 rpm, polishing carrier speed of 150 rpm, slurry flow rate of 100 ml/min, and polishing downforce of 50 N. Each disk was polished for 5 minutes and subsequently cleaned with EDC 100 (Exclusive Design Company, Inc.) cleaning solution.

EXAMPLE 1

This example illustrates the significance of using a halide-containing complexing agent in accordance with the present invention.

Nickel-phosphor plated rigid disks were polished using four different polishing systems (polishing systems 1A–1D). Each of polishing systems 1A–1D contained 4 wt. % silica (Akzo-Nobel Bindzil 50/80 condensation-polymerized silica) and an oxidant as indicted in Table 1. Polishing systems 1A and 1B were the same except for the presence of KCl in polishing system 1B as a complexing agent source. Similarly, polishing systems 1C and 1D were the same except for the presence of KCl in polishing system 1D as a complexing agent source. Table 1 sets forth the pH of each polishing system and the polishing rate resulting from the use of each polishing system.

TABLE 1

| Polishing System | pH | Oxidant | Complexing Agent Source | Amount of Halide Ion in the Composition | Polishing Rate (Å/min) |
|---|---|---|---|---|---|
| 1A (comparative) | 2.2 | 0.25 wt. % Fe(NO$_3$)$_3$ | none | — | 1461 |
| 1B | 2.2 | 0.25 wt. % Fe(NO$_3$)$_3$ | 0.5 wt. % KCl | 0.24 wt. % Cl$^-$ | 1811 |
| 1C (comparative) | 4 | 0.25 wt. % hydroxylamine nitrate | none | — | 696 |
| 1D | 4 | 0.25 wt. % hydroxylamine nitrate | 0.5 wt. % KCl | 0.24 wt. % Cl$^-$ | 815 |

The results recited in Table 1 show that the polishing rates resulting from the use of polishing systems containing a halide ion complexing agent (polishing systems 1B and 1D) were significantly greater than the corresponding polishing rates resulting from the use of polishing systems that did not contain a complexing agent (comparative polishing systems 1A and 1C).

This example demonstrates that the presence of a halide-containing complexing agent in the method of the present invention significantly impacts the polishing rate with respect to a rigid disk.

EXAMPLE 2

This example further illustrates the significance of using a halide-containing complexing agent in accordance with the present invention.

Nickel-phosphor plated rigid disks were polished using five different polishing systems (polishing systems 2A–2E). Each of polishing systems 2A–2E contained 4 wt. % silica (AkzoNobel Bindzil 50/80 condensation-polymerized silica) and an oxidant as indicted in Table 2. Polishing systems 2B–2E also contained either KCl (polishing systems 2B and 2C) or KBr (polishing systems 2D and 2E) as a complexing agent source. Table 2 sets forth the pH of each polishing system and the polishing rate resulting from the use of each polishing system.

TABLE 2

| Polishing System | pH | Oxidant | Complexing Agent Source | Amount of Halide Ion in the Composition | Polishing Rate (Å/min) |
|---|---|---|---|---|---|
| 2A (comparative) | 2.5 | 0.45 wt. % $H_2O_2$ | none | — | 254 |
| 2B | 2.5 | 0.45 wt. % $H_2O_2$ | 0.5 wt. % KCl | 0.24 wt. % $Cl^-$ | 503 |
| 2C | 2.5 | 0.45 wt. % $H_2O_2$ | 2 wt. % KCl | 0.95 wt. % $Cl^-$ | 549 |
| 2D | 2.5 | 0.45 wt. % $H_2O_2$ | 0.5 wt. % KBr | 0.34 wt. % $Br^-$ | 478 |
| 2E | 2.5 | 0.45 wt. % $H_2O_2$ | 2 wt. % KBr | 1.3 wt. % $Br^-$ | 516 |

The results recited in Table 2 show that the polishing rates resulting from the use of polishing systems containing a halide ion complexing agent (e.g., Cl (polishing systems 2B and 2C) or $Br^-$(polishing systems 2D and 2E)) were significantly greater than the polishing rates resulting from the use of polishing systems that did not contain a complexing agent (comparative polishing system 2A). Moreover, a comparison of the polishing rates resulting from the use of polishing systems containing 2 wt. % of a halide ion complexing agent (polishing systems 2C and 2E) with the polishing rates resulting from the use of polishing systems containing 0.5 wt. % of a halide ion complexing agent (polishing systems 2B and 2E) shows that the polishing rate increases with increasing amounts of the complexing agent.

This example demonstrates that the presence of a halide-containing complexing agent in the method of the present invention significantly impacts the polishing rate with respect to a rigid disk and that the amount of complexing agent used in accordance with the present invention can be adjusted to modify the polishing rate, as desired.

EXAMPLE 3

This example illustrates the significance of using an ammonia-containing complexing agent with an oxidant in accordance with the present invention.

Nickel-phosphor plated rigid disks were polished using five different polishing systems (polishing systems 3A–3E). Each of polishing systems 3A–3E contained 4 wt. % silica (Akzo-Nobel Bindzil 50/80 condensation-polyrnerized silica) and either a complexing agent (polishing systems 3A and 3B), an oxidant (polishing system 3C), or both (polishing systems 3D and 3E), as indicated in Table 3. Table 3 sets forth the pH of each polishing system and the polishing rate resulting from the use of each polishing system.

As indicated by the results recited in Table 3, the polishing rates resulting from the use of polishing systems having both an oxidant and an ammonia-containing complexing agent (polishing systems 3D and 3E) were significantly greater than the polishing rates resulting from the use of polishing systems having a complexing agent or oxidant alone (polishing systems 3A, 3B, and 3C). The results also demonstrate that the ammonia-containing complexing agent can be provided by the oxidant (polishing system 3E) or can be provided separately (polishing system 3D), while still yielding relatively high polishing rates.

This example demonstrates that the presence of an ammonia-containing complexing agent, in conjunction with an oxidant, in the method of the present invention significantly impacts the polishing rate with respect to a rigid disk.

EXAMPLE 4

This example illustrates the significance of using an ammonia complexing agent in accordance with the present invention.

Nickel-phosphor plated rigid disks were polished using seven different polishing systems (polishing systems 4A–4G condensation-polymerized silica). Each of polishing systems 4A–4G contained 4 wt. % silica (Akzo-Nobel Bindzil 50/80 condensation polymerized silica) and an oxidant as indicted in Table 4. Polishing system 4A did not contain a complexing agent source, while polishing systems 4B–4G contained $NH_3 \cdot H_2O$ as a complexing agent source. Table 4 sets forth the pH of each polishing system and the polishing rate resulting from the use of each polishing system.

TABLE 3

| Polishing System | pH | Oxidant | Complexing Agent Source | Total Amount of Ammonia in the Composition [M] | Polishing Rate (Å/min) |
|---|---|---|---|---|---|
| 3A (comparative) | 9.5 | none | 0.5 wt. % $K_2C_2O_4$ | 0.00 | 211 |
| 3B (comparative) | 9.5 | none | 0.15 wt. % $NH_3 \cdot H_2O$ | 0.06 | 366 |
| 3C (comparative) | 9.5 | 0.5 wt. % $K_2S_2O_8$ | none | 0.00 | 287 |
| 3D | 9.5 | 0.5 wt. % $K_2S_2O_8$ | 0.5 wt. % $K_2C_2O_4$ + 0.15 wt. % $NH_3 \cdot H_2O$ | 0.06 | 1501 |
| 3E | 9.5 | 0.5 wt. % $(NH_4)_2S_2O_8$ | (provided by the oxidant) | 0.03 | 1118 |

TABLE 4

| Polishing System | pH | Oxidant | Complexing Agent Source | Total Amount of Ammonia in the Composition [M] | Polishing Rate (Å/min) |
|---|---|---|---|---|---|
| 4A (comparative) | 9.5 | 1 wt. % NaBO$_3$ | none | 0.00 | 244 |
| 4B | 9.5 | 1 wt. % NaBO$_3$ | 0.15 wt. % NH$_3$·H$_2$O | 0.06 | 584 |
| 4C | 9.5 | 0.5 wt. % (NH$_4$)$_2$S$_2$O$_8$ | 0.15 wt. % NH$_3$·H$_2$O | 0.08 | 1290 |
| 4D | 10 | 0.75 wt. % KClO$_3$ | 0.3 wt. % NH$_3$·H$_2$O | 0.15 | 538 |
| 4E | 10 | 0.75 wt. % KBrO$_3$ | 0.3 wt. % NH$_3$·H$_2$O | 0.15 | 1057 |
| 4F | 10 | 0.6 wt. % H$_2$O$_2$ | 0.3 wt. % NH$_3$·H$_2$O | 0.15 | 853 |
| 4G | 10 | 0.5 wt. % (NH$_4$)$_2$S$_2$O$_8$ | 0.3 wt. % NH$_3$·H$_2$O | 0.19 | 1575 |

The results recited in Table 4 show that the polishing rates resulting from the use of polishing systems with an ammonia-containing complexing agent (polishing systems 4B–4G) were significantly greater than the polishing rate resulting from the use of polishing systems that did not contain a complexing agent (comparative polishing system 4A). Moreover, a comparison of the polishing rates resulting from the use of polishing systems 4C and 4G (using the same oxidant with different concentrations of ammonia) shows that the polishing rate increases with increasing amounts of NH$_3$·H$_2$O.

This example demonstrates that the presence of an ammonia-containing complexing agent, in conjunction with an oxidant, in the method of the present invention significantly impacts the polishing rate with respect to a rigid disk and that an ammonia containing complexing agent can be used in conjunction with various oxidizing agents according to the method of the present invention to polish a substrate with relatively high polishing rates.

All of the references cited herein, including patents, patent applications, and publications, are hereby incorporated in their entireties by reference.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims.

What is claimed is:

1. A method for polishing a surface of a memory or rigid disk comprising:
   (a) providing a polishing system comprising (i) a polishing composition comprising water, an oxidizing agent, and a complexing agent selected from the group consisting of ammonia, halide ions, and mixtures thereof, and (ii) a polishing pad, an abrasive, or a combination thereof,
   (b) contacting at least a portion of a surface of a memory or rigid disk with the polishing system, and
   (c) moving the polishing system relative to the memory or rigid disk to polish at least a portion of the surface of the memory or rigid disk.

2. The method of claim 1, wherein the surface of the memory or rigid disk comprises nickel-phosphorous.

3. The method of claim 1, wherein the polishing system comprises a polishing pad.

4. The method of claim 3, wherein the polishing system comprises an abrasive that is fixed in or on the polishing pad.

5. The method of claim 1, wherein the polishing system comprises an abrasive.

6. The method of claim 5, wherein the abrasive is suspended in the polishing composition.

7. The method of claim 6, wherein the abrasive is a metal oxide abrasive.

8. The method of claim 7, wherein the abrasive is selected from the group consisting of alumina, silica, titania, ceria, zirconia, germania, magnesia, coformed products thereof, and combinations thereof.

9. The method of claim 8, wherein the abrasive is silica.

10. The method of claim 9, wherein the abrasive is condensation-polymerized silica particles.

11. The method of claim 6, wherein the abrasive is present in a concentration of about 0.1–30 wt. % of the polishing composition.

12. The method of claim 1, wherein the oxidizing agent is selected from the group consisting of peroxides, iodates, bromates, perchlorates, persulfates, nitrates, and mixtures thereof.

13. The method of claim 12, wherein the oxidizing agent is present in a concentration of at least 0.01–10 wt. % of the polishing composition.

14. The method of claim 13, wherein the oxidizing agent does not chemically react with ammonia.

15. The method of claim 14, wherein the oxidizing agent is a persulfate, an iodate, a nitrate, or a peroxide.

16. The method of claim 1, wherein the complexing agent is chloride, bromide, iodide, or a mixture thereof.

17. The method of claim 16, wherein the complexing agent is present in a concentration of about 0.01–15 wt. % of the polishing composition.

18. The method of claim 1, wherein the complexing agent is an ammonia molecule.

19. The method of claim 18, wherein the pH of the polishing system is at least about 7.

20. The method of claim 19, wherein the pH of the polishing system is about 8–12.

21. The method of claim 1, wherein the complexing agent is a halide ion.

22. The method of claim 21, wherein the oxidizing agent is ferric nitrate, the complexing agent is provided by a potassium halide salt, and the pH of the polishing system is about 1–4.

* * * * *